(12) United States Patent
Wu et al.

(10) Patent No.: US 9,513,982 B1
(45) Date of Patent: Dec. 6, 2016

(54) METHODS AND SYSTEMS FOR REDUCING DECODER ERROR FLOOR FOR AN ELECTRONIC NON-VOLATILE COMPUTER STORAGE APPARATUS

(71) Applicant: LSI Corporation, San Jose, CA (US)

(72) Inventors: Yunxiang Wu, Cupertino, CA (US); Ivana Djurdjevic, Saratoga, CA (US); Yu Cai, San Jose, CA (US); Earl Cohen, Oakland, CA (US); Erich F. Haratsch, Bethlehem, PA (US)

(73) Assignee: Seagate Technology LLC, Cupertino, CA (US)

( * ) Notice: Subject to any disclaimer, the term of this patent is extended or adjusted under 35 U.S.C. 154(b) by 153 days.

(21) Appl. No.: 14/273,719

(22) Filed: May 9, 2014

Related U.S. Application Data

(60) Provisional application No. 61/977,399, filed on Apr. 9, 2014.

(51) Int. Cl.
*G11C 29/00* (2006.01)
*G06F 11/07* (2006.01)

(52) U.S. Cl.
CPC .................. *G06F 11/073* (2013.01)

(58) Field of Classification Search
CPC .............. G06F 11/1072; G11C 7/1006; G11C 11/5642; G11C 16/26; G11C 2211/5644
See application file for complete search history.

(56) References Cited

U.S. PATENT DOCUMENTS

| 7,656,707 | B2 | 2/2010 | Kozlov | |
|---|---|---|---|---|
| 9,209,835 | B2 * | 12/2015 | Alhussien | .......... H03M 13/1125 |
| 9,213,599 | B2 * | 12/2015 | Wu | ...................... G06F 11/1068 |
| 2009/0154236 | A1 * | 6/2009 | Kozlov | ............... G06F 11/1072 365/185.03 |
| 2013/0077400 | A1 * | 3/2013 | Sakurada | ............ G11C 11/5642 365/185.03 |
| 2013/0176778 | A1 | 7/2013 | Chen et al. | |

* cited by examiner

*Primary Examiner* — Guy Lamarre
(74) *Attorney, Agent, or Firm* — Suiter Swantz pc llo

(57) ABSTRACT

An electronic non-volatile computer storage apparatus and methods for reducing decoder error floor for such a storage apparatus are disclosed. An analysis process it utilized to study one or more performance metrics of a decoder of the storage apparatus in order to determine various endurance points throughout the lifetime of that particular type of storage apparatus. Theses endurance points indicate when different scaling factors should be applied and/or when log-likelihood ratio should be re-measured to accommodate physical degradations over time.

20 Claims, 2 Drawing Sheets

METHODS AND SYSTEMS FOR REDUCING DECODER ERROR FLOOR FOR AN ELECTRONIC NON-VOLATILE COMPUTER STORAGE APPARATUS

CROSS-REFERENCE TO RELATED APPLICATIONS

The present application claims the benefit under 35 U.S.C. §119(e) of U.S. Provisional Application Ser. No. 61/977,399, filed Apr. 9, 2014. Said U.S. Provisional Application Ser. No. 61/977,399 is hereby incorporated by reference in its entirety.

TECHNICAL FIELD

The present invention relates to the field of flash memory and particularly to the flash memory decoding process.

BACKGROUND

Flash memory is an electronic non-volatile computer storage apparatus that can be electrically erased and reprogrammed.

SUMMARY

Accordingly, an embodiment of the present disclosure is directed to a method. The method includes: measuring a first non-volatile memory device of a particular type to determine a plurality of log-likelihood ratio scaling factors at respective endurance points; operating a decoder communicatively coupled to a second non-volatile memory device of the particular type using an initial one of the log-likelihood ratio scaling factors; and in response to the second non-volatile memory device crossing a first one of the endurance points, switching to using a subsequent one of the log-likelihood ratio scaling factors.

A further embodiment of the present disclosure is also directed to a log-likelihood ratio quantization method. The method includes: tracking a program-erase cycle count of an electronic non-volatile computer storage device; applying an initial scaling factor for scaling a log-likelihood ratio for a decoder of the electronic non-volatile computer storage device when the program-erase cycle count of the electronic non-volatile computer storage device is below a program-erase cycle threshold; re-measuring the log-likelihood ratio for the decoder of the electronic non-volatile computer storage device every predetermined number of program-erase cycles according to a re-measurement interval when the program-erase cycle count of the electronic non-volatile computer storage device exceeds the program-erase cycle threshold; and applying a scaling factor for the re-measured log-likelihood ratio every predetermined number of program-erase cycles according to the re-measurement interval.

An additional embodiment of the present disclosure is directed to an electronic non-volatile computer storage apparatus. The electronic non-volatile computer storage apparatus includes a storage module configured to store encoded data, a log-likelihood ratio generation module configured to measure a log-likelihood ratio, a scaling module configured to conditionally applying scaling factors to scale the log-likelihood ratio, and a quantization module configured to quantize the scaled log-likelihood ratio for a decoder. More specifically, the scaling module is configured to track a performance metric of the electronic non-volatile computer storage apparatus. When the performance metric of the electronic non-volatile computer storage apparatus is below a first one of a plurality of endurance points, the scaling module is configured to apply an initial scaling factor to scale the log-likelihood ratio. The scaling module is further configured to apply a subsequent scaling factor to scale the log-likelihood ratio when the performance metric of the electronic non-volatile computer storage apparatus crosses each of the subsequent endurance points.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Flash memory stores information in an array of memory cells made from floating-gate transistors. In traditional single-level cell (SLC) devices, each cell stores only one bit of information. Newer flash memory, known as multi-level cell (MLC) devices, including triple-level cell (TLC) devices, can store more than one bit per cell by choosing between multiple levels of electrical charge to apply to the floating gates of its cells. More levels in a cell means finer voltage threshold in programming and read back, which also makes MLC/TLC devices prone to noises. Stronger error correcting codes such as BCH code, low-density parity-check (LDPC) code, polar code and the like with soft decoding are commonly needed for MLC/TLC devices.

Figure 1:
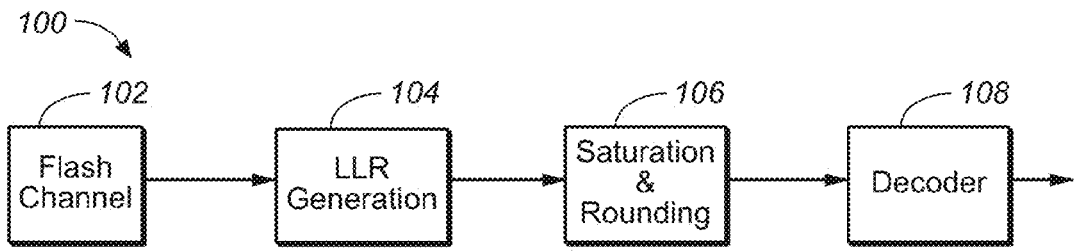
FIG. 1 is a block diagram depicting a flash channel.

A soft decoding process generally uses a log-likelihood ratio (LLR) obtained through multiple measurements. FIG. 1 is a block diagram of a flash channel 100 illustrating this process. More specifically, as depicted in FIG. 1, LLRs can be calculated or measured utilizing the LLR generation module 104 by reading the flash channel 102 (may be referred to as the storage module) to obtain soft-decision information which is then converted to LLR format. In a first example, the storage modules are read multiple times with varying read voltages. In a second example, the storage modules directly provide a representation of the charge storage representing each bit, such as a 3-bit or 4-bit soft-decision value. Since the LLRs are continuous values but error correcting codes (e.g., LDPC code) used by the decoder 108 have finite bit precisions, a process generally referred to as LLR quantization 106 is needed before providing the LLRs to the decoder 108. It is noted that the LLRs can be quantized using various techniques. For example, a process known as saturation and rounding can be used to clip a continuous LLR value to an interval, and then round the values within this interval to discrete values (e.g., integers).

It is also noted that by clipping a continuous LLR value and rounding the remaining values to a finite bit precision, this quantization process effectively makes reliable samples less reliable and therefore introduces distortion. Such distortions have a negative impact on the decoding process and also increase the decoder error floor. It is therefore important to improve quality of channel LLRs and make them more suitable for the decoder.

Figure 2:
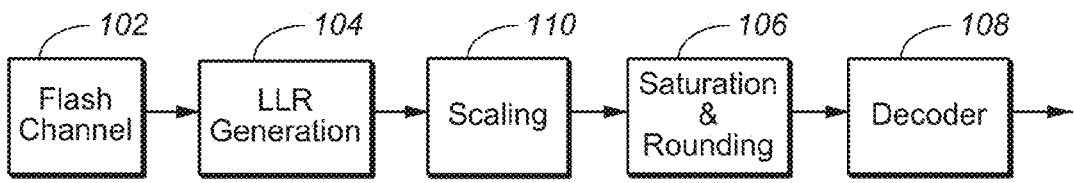
FIG. 2 is a block diagram depicting a flash channel, including a scaling module.

One such technique, as depicted in FIG. 2, uses a scaling module 110 to accurately scale LLRs to a target range before LLR quantization 106 in order to yield an accurate and reasonable set of quantized LLRs. This technique is disclosed in U.S. patent application Ser. No. 13/853,282, entitled "Dynamic Log Likelihood Ratio Quantization for Solid State Drive Controllers," which is incorporated herein by reference. More specifically, this technique normalizes channel LLRs within the range of minimum LLR value and maximum LLR value before saturation to mitigate/minimize distortions.

Embodiments of the present disclosure are directed to systems and methods to further improve the performance of the scaling module 110 based on the program-erase cycle count of the storage device. A program-erase cycle is a sequence of events in which data is written to an electronic non-volatile computer storage apparatus (e.g., a flash storage device), then erased, and then rewritten. Program-erase cycles can serve as a criterion for quantifying the endurance of a flash storage device, since a flash storage device is capable of a certain number of program-erase cycles because each cycle causes a small amount of physical damage to the medium. This damage accumulates over time, eventually rendering the device unusable.

Figure 3:
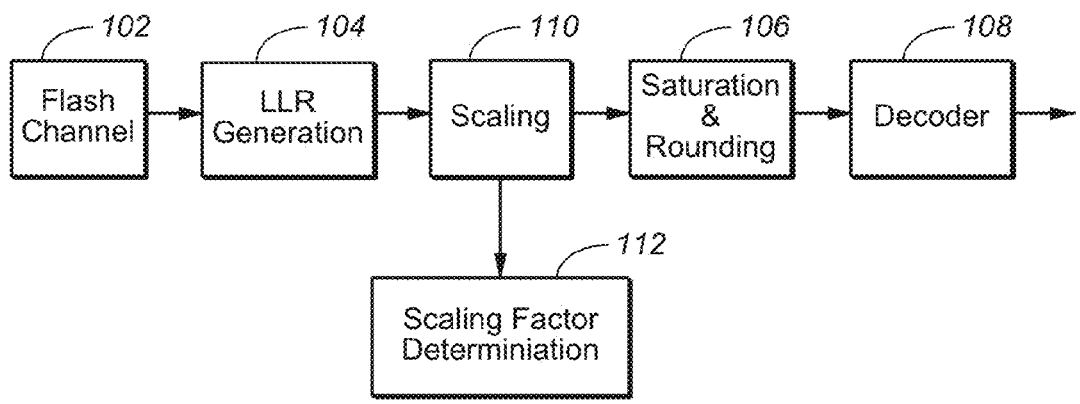
FIG. 3 is a block diagram depicting a flash channel, including a scaling module and a scaling factor determination module.

Embodiments of the present disclosure therefore utilize different scaling factors for different program-erase cycle counts to accommodate the physical degradation over time. As depicted in FIG. 3, a scaling factor determination module 112 is utilized to determine a proper scaling factor based on the program-erase cycle count. For instance, for the first few thousand program-erase cycles, the flash storage device should be in a reasonably good shape, and a first scaling factor can be used. Subsequently, as the program-erase cycle count increases, the scaling factor determination module 112 will select different scaling factors to be used. It is contemplated that these scaling factors can be determined for a particular type of flash storage device beforehand and stored in a lookup table, or they can be determined as a part of the decoding process without departing from the spirit and scope of the present disclosure.

Figure 4:
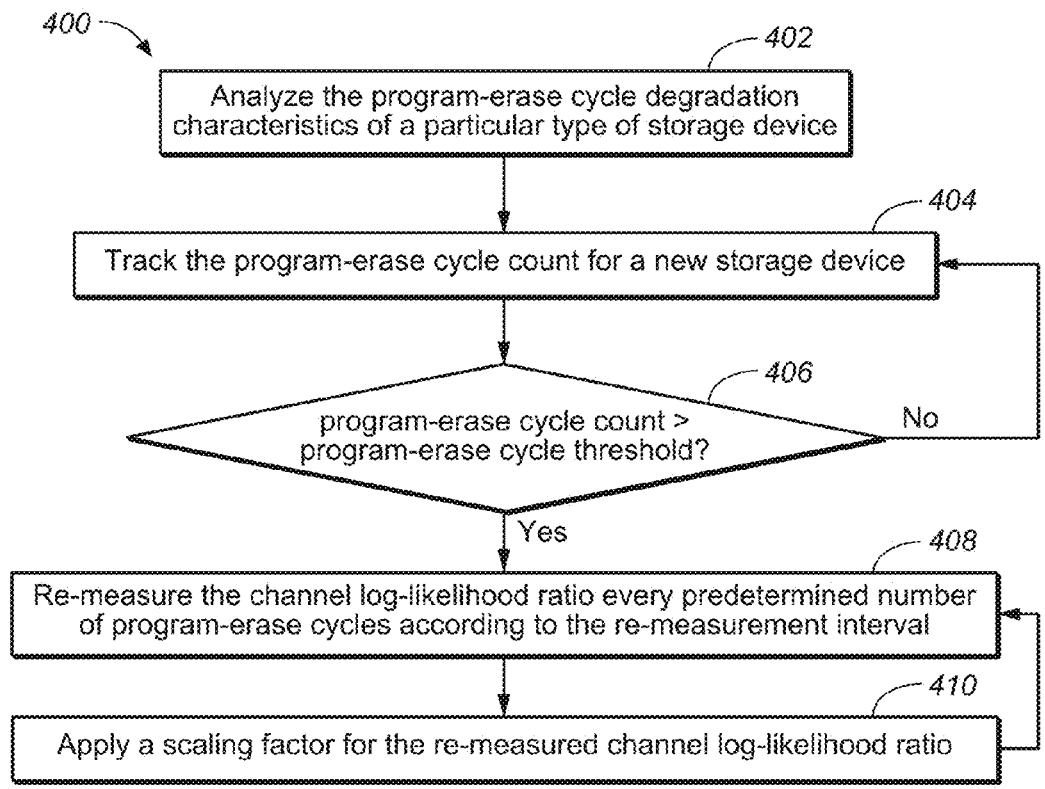
FIG. 4 is a flow diagram depicting a log-likelihood ratio quantization method for decoder error floor reduction.

Referring to FIG. 4, a flow diagram depicting a log-likelihood ratio quantization method 400 utilized for decoder error floor reduction is shown. In one embodiment, method 400 utilizes an analysis process to study the program-erase cycle degradation characteristics of a particular type of flash storage device first in step 402. For example, the flash storage device being analyzed can be written, erased, and then rewritten a number of times to observe its behavior. It may be observed that for the first several thousand program-erase cycles, using a first scaling factor provides a reasonably good success rate, but the success rate starts to decrease as the program-erase cycle count continues to increase. The analysis process can therefore record the number of program-erase cycle count when the degradation starts to occur, 4000 program-erase cycle count as an example, and suggest using the first scaling factor only for the first 4000 program-erase cycles for a new flash storage device of the same type in the future.

The analysis process should continue to study the program-erase cycle degradation characteristics after the degradation first started to occur. For instance, using the same example above, the analysis process may observe that after the first 4000 program-erase cycles, the success rate of the decoder continues to decrease, and it may be beneficial to re-measure the channel LLR every predetermined number of program-erase cycles (e.g., every 1000 program-erase cycles) thereafter. In addition, the analysis process may also determine a proper scaling factor for each of the re-measured channel LLR. Using the current example, when the program-erase cycle count reaches 4000, the channel LLR should be re-measured and a scaling factor should be determined to scale this re-measured LLR. Similarly, when the program-erase cycle count reaches 5000, the channel LLR should be re-measured again and a scaling factor should be determined to scale this newly re-measured LLR. This process should then repeat at least every 1000 cycles, until the storage device is eventually rendered unusable.

It is contemplated that the scaling factors can be determined utilizing various techniques. For example, the techniques disclosed in U.S. patent application Ser. No. 13/853, 282, entitled "Dynamic Log Likelihood Ratio Quantization for Solid State Drive Controllers," and/or other techniques may be utilized. It is also contemplated that the scaling factors can be linear and/or non-linear without departing from the spirit and scope of the present disclosure.

It is further contemplated that the specific numbers of program-erase cycles depicted in the example above are merely exemplary for illustrative purposes. In more generic terms, the analysis process is configured to determine a program-erase cycle threshold under which LLR re-measurement is not required. The analysis process is also configured to determine a re-measurement interval which indicates how often LLR re-measurement should take place after the program-erase cycle count of the flash storage device have exceeded the threshold. In other words, the analysis process in accordance with embodiments of the present disclosure studies one or more performance metrics of the decoder (e.g., the degradation characteristics) of a particular type of memory device in order to determine various endurance points throughout the lifetime of that particular type of memory device. Theses endurance points indicate when different scaling factors should be applied and/or when LLR should be re-measured.

In accordance with embodiments depicted in FIG. 4, once the program-erase cycle threshold, the re-measurement interval, and the scaling factors for each re-measurement interval are determined, the results can be stored in a lookup table or a data recording device and utilized for handling flash storage devices of the same type in the future. In one embodiment, the lookup table is saved into the firmware of the flash storage device and used during the lifetime of the flash storage device.

More specifically, as depicted in step 404, the program-erase cycle count is tracked for each new flash storage device, and as long as the program-erase cycle count is under the program-erase cycle threshold, the LLR does not need to be re-measured and the same scaling factor can be used for scaling the LLR. However, once it is determined in step 406 that the program-erase cycle count has exceeded the program-erase cycle threshold, the channel LLR must be re-measure every predetermined number of program-erase cycles according to the re-measurement interval in step 408 and the re-measured channel LLR must be scaled in step 410 using a scaling factor predetermined for the current re-measurement interval. As previously mentioned, steps 408 and 410 can repeat until the storage device is eventually rendered unusable.

It is noted that the decoder error floor reduction method 400 as described above only have negligible complexity and throughput impact on the storage device. More specifically, the analysis process described in step 402 is performed offline and therefore has no impact on the performance of the storage device. The storage device firmware/controller needs to periodically check the program-erase cycle counts, which does not add complexity to the decoding process. The only complexity is accessing a very small lookup table loaded into the storage device firmware memory, which only happens once for every predetermined re-measurement interval (e.g., every 1000 program-erase cycles).

It is contemplated that certain processes described in the decoder error floor reduction method 400 may be modified without departing from the spirit and scope of the present disclosure. For instance, the analysis process performed in step 402 as described above studies the program-erase cycle degradation characteristics of a particular type of flash storage device and determines a program-erase cycle threshold under which LLR re-measurement is not required. The analysis process also determines a re-measurement interval and scaling factors for each of the subsequent re-measurement interval. In an alternative embodiment, however, the analysis process does not need to determine the scaling factors. That is, only the program-erase cycle threshold and the LLR re-measurement interval is determined in step 402.

It is contemplated that the rest of the steps in method 400 can be performed in the same manner as described above, and the only difference is that instead of using a predetermined scaling factor in step 410, the scaling factor is determined in conjunction with the decoder. For instance, a candidate factor can be used to scale the re-measurement LLR, which is subsequently used by the decoder, and if the candidate factor leads to a successful decoding, step 410 can continue to use this candidate factor. On the other hand, if the candidate factor does not lead to a successful decoding, step 410 may try additional candidate factors one by one. It is noted that utilizing this alternative approach may be slower than utilizing a predetermined scaling factor readily available in a lookup table; however, since soft retry is a relatively rare event, this approach is still acceptable. In either case, regardless of whether the method 400 utilizes predetermined factors or determines scaling factors inline with the decoding process, it is noted that both approaches significantly reduces the decoder error floor with negligible additional complexity, and without changing the decoder itself.

It is also contemplated that the program-erase cycle threshold can be configured to be advisory rather than mandatory in certain embodiments. Additionally/alternatively, the determination to switch to a next one of the predetermined scaling factors can be based on a performance metric of the decoder, such as a function of a number of iterations of an iterative decoder (e.g., an average over some interval of the number of iterations). In these cases, the switch to the next one of the predetermined scaling factors is according to a dynamically measured endurance point (i.e., an amount of wear) of the flash storage device, whereas the program-erase cycle threshold is a statically determined endurance point.

It is further contemplated that re-measurement intervals are not limited to a fixed number of program-erase cycles. For instance, as program-erase cycles increase to the end of the lifetime of certain storage devices, the channel may distort super linearly over program-erase cycles. In such cases, the re-measurement intervals can be shortened and re-measurements can take place more frequently towards the end of the lifetime of the storage devices. In one embodiment, once the reading fails after step 410, the key parameters are re-learned immediately, and the re-measurement interval previously utilized is reduced (e.g., instead of every 1000 program-erase cycles, the reduced re-measurement interval can be shortened to every 500 program-erase cycles). This reduction process may continue if the channel gets even worse, and the re-measurement interval can be further reduced by another half (e.g. 250 program-erase cycles). It is noted that while this online learning task become heavier over program-erase cycles, the data can still be successfully read which otherwise would fail, and therefore this process effectively extends the lifetime of the storage device. It is also noted that this re-measurement interval reduction technique can be either enabled or disabled by firmware. If the re-measurement interval reduction technique is disabled, the system will work in the same manner with fixed re-measurement intervals as previously described.

It is contemplated that while flash storage devices and flash memories are described above as an exemplary electronic non-volatile computer storage apparatus, the techniques disclosed in the present disclosure are applicable to other types of electronic non-volatile computer storage apparatus that utilize one or more levels of electrical charge for data encoding, decoding and storage without departing from the spirit and scope of the present disclosure.

It is also contemplated that the decoding methods described above can be utilized in a solid state drive, a hybrid drive, or a part of a higher level system, such as a RAID (redundant array of inexpensive storage devices or redundant array of independent storage devices) based storage system that utilizes at least one electronic non-volatile computer storage device. Such a RAID storage system increases stability and reliability through redundancy, combining multiple storage devices as a logical unit. Data may be spread across a number of storage devices included in the RAID storage system according to a variety of algorithms and accessed by an operating system as if it were a single storage devices. For example, data may be mirrored to multiple storage devices in the RAID storage system, or may be sliced and distributed across multiple storage devices in a number of techniques. If a small number of storage devices in the RAID storage system fail or become unavailable, error correction techniques may be used to recreate the missing data based on the remaining portions of the data from the other storage devices in the RAID storage system. The storage devices in the RAID storage system may be, but are not limited to, individual storage systems such hard disk drives, solid state drives, hybrid drives or any combination of such drives, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

As mentioned previously, the storage device configuration can be varied in other embodiments of the invention. For example, the storage device may comprise a hybrid hard disk drive which includes a flash memory in addition to one or more storage disks. In addition, storage device may be coupled to or incorporated within a host processing device, which may be a computer, server, communication device, etc.

Figure 5:
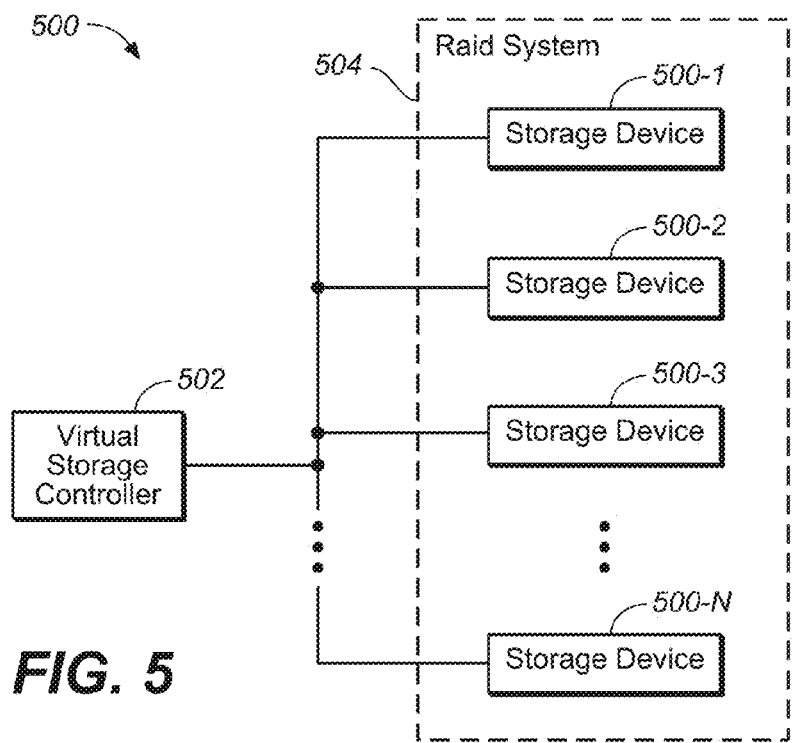
FIG. 5 is a block diagram depicting a storage system.

Furthermore, multiple storage devices 500-1 through 500-N possibly of various different types may be incorporated into a virtual storage system 500 as illustrated in FIG. 5. The virtual storage system 500, also referred to as a storage virtualization system, illustratively comprises a virtual storage controller 502 coupled to a RAID system 504. The RAID system more specifically comprises N distinct storage devices denoted 500-1, 500-2, . . . 500-N, one or more of which may be solid state drives. Furthermore, one or more of the solid state drives of the RAID system are assumed to be configured to utilize the decoding circuitry as disclosed herein. These and other virtual storage systems comprising solid state drives or other storage devices are considered embodiments of the invention.

Embodiments of the invention may also be implemented in the form of integrated circuits. In a given such integrated circuit implementation, identical die are typically formed in a repeated pattern on a surface of a semiconductor wafer. Each die includes, for example, at least a portion of decoding circuitry as described herein, and may further include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

It should again be emphasized that the above-described embodiments of the invention are intended to be illustrative only. For example, other embodiments can use different types and arrangements of storage disks, read/write heads, read channel circuitry, signal processing circuitry, decoders, filters, detectors, and other storage device elements for implementing the described error correction functionality. Also, the particular manner in which certain steps are performed in the signal processing may vary. Further, although embodiments of the invention have been described with respect to storage disks such as solid state drives, embodiments of the invention may be implemented various other devices including optical data-storage applications and wireless communications. These and numerous other alternative embodiments within the scope of the following claims will be apparent to those skilled in the art.

Furthermore, embodiments of the invention are applicable to any communication channel that employs low density parity check technology (LDPC). LDPC technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes, optical data-storage, and memory devices such as DRAM, NAND flash, NOR flash, other non-volatile memories, solid state drives, and hybrid drives.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
analyzing program-erase cycle degradation characteristics of a first non-volatile memory device of a particular type to determine a plurality of log-likelihood ratio scaling factors at a plurality of endurance points;
operating a decoder communicatively coupled to a second non-volatile memory device of the particular type using an initial one of the log-likelihood ratio scaling factors; and
in response to the second non-volatile memory device crossing a first one of the plurality of endurance points, switching to using a subsequent one of the log-likelihood ratio scaling factors to improve quality of log-likelihood ratio quantization of the second non-volatile memory.

2. The method of claim 1, wherein the subsequent log-likelihood ratio scaling factor is the one of the log-likelihood ratio scaling factors associated with the first endurance point.

3. The method of claim 1, wherein the first endurance point is according to a program-erase cycle threshold.

4. The method of claim 1, wherein at least one of the plurality of endurance points is according to a performance metric of the decoder.

5. The method of claim 4, wherein the performance metric is according to a number of iterations of the decoder.

6. A log-likelihood ratio quantization method, comprising:
tracking a program-erase cycle count of an electronic non-volatile computer storage device;
applying an initial scaling factor for scaling a log-likelihood ratio when the program-erase cycle count of the electronic non-volatile computer storage device is below a program-erase cycle threshold, the log-likelihood ratio being an input to a decoder of the electronic non-volatile computer storage device;
re-measuring the log-likelihood ratio every predetermined number of program-erase cycles according to a re-measurement interval when the program-erase cycle count of the electronic non-volatile computer storage device exceeds the program-erase cycle threshold; and applying a scaling factor for the re-measured log-likelihood ratio every predetermined number of program-erase cycles according to the re-measurement interval to improve quality of the log-likelihood ratio quantization of the electronic non-volatile computer storage device.

7. The method of claim 6, wherein the program-erase cycle threshold and the re-measurement interval are predetermined by analyzing program-erase cycle degradation characteristics of another electronic non-volatile computer storage device of the same type.

8. The method of claim 7, wherein analyzing the program-erase cycle degradation characteristics of the other electronic non-volatile computer storage device of the same type further determines a plurality of scaling factors corresponding to a plurality of re-measurement intervals.

9. The method of claim 8, wherein the scaling factor applied for the re-measured log-likelihood ratio every predetermined number of program-erase cycles is selected from the plurality of scaling factors corresponding to the plurality of re-measurement intervals.

10. The method of claim 6, wherein the scaling factor applied for the re-measured log-likelihood ratio every predetermined number of program-erase cycles is determined in conjunction with the decoder.

11. The method of claim 6, wherein the electronic non-volatile computer storage device is a flash storage device.

12. The method of claim 6, wherein the decoder implements at least one low density parity check decoder.

13. The method of claim 6, further comprising:
re-measuring the log-likelihood ratio according to a second re-measurement interval when the program-erase cycle count of the electronic non-volatile computer storage device exceeds the second program-erase cycle threshold, the second re-measurement interval being reduced from the first mentioned re-measurement interval.

14. An electronic non-volatile computer storage apparatus, comprising:
a storage module;
a log-likelihood ratio measurement module configured to read the storage module and measure a log-likelihood ratio;
a scaling module configured to conditionally apply scaling factors to scale the log-likelihood ratio; and
a quantization module configured to quantize the scaled log-likelihood ratio and provide the scaled log-likelihood ratio as an input to a decoder;
wherein the scaling module is configured to:
track a performance metric of the electronic non-volatile computer storage apparatus;
apply an initial scaling factor to scale the log-likelihood ratio when the performance metric of the electronic non-volatile computer storage apparatus is below a first one of a plurality of endurance points; and
apply a subsequent scaling factor to scale the log-likelihood ratio when the performance metric of the electronic non-volatile computer storage apparatus crosses each of the subsequent endurance points.

15. The electronic non-volatile computer storage apparatus of claim 14, wherein the endurance points are predetermined by analyzing program-erase cycle degradation characteristics of another electronic non-volatile computer storage apparatus having a same type of storage module.

16. The electronic non-volatile computer storage apparatus of claim 15, wherein analyzing the program-erase cycle degradation characteristics of the other electronic non-volatile computer storage apparatus further determines a plurality of scaling factors at respective ones of the endurance points.

17. The electronic non-volatile computer storage apparatus of claim 14, wherein the log-likelihood ratio generation module is further configured to re-measure the log-likelihood ratio when the performance metric of the electronic non-volatile computer storage apparatus crosses each of the endurance points.

18. The electronic non-volatile computer storage apparatus of claim 17, wherein at least one of the endurance points is according to a program-erase cycle count.

19. The electronic non-volatile computer storage apparatus of claim 14, wherein the electronic non-volatile computer storage apparatus is a flash storage apparatus.

20. The electronic non-volatile computer storage apparatus of claim 14, wherein the decoder implements at least one low density parity check decoder.

\* \* \* \* \*